(12) United States Patent
Falkenburg et al.

(10) Patent No.: US 10,594,170 B2
(45) Date of Patent: Mar. 17, 2020

(54) WIRELESS POWER SYSTEM WITH INTERFERENCE AVOIDANCE

(71) Applicant: Apple Inc., Cupertino, CA (US)

(72) Inventors: David R. Falkenburg, San Jose, CA (US); Cortland S. Tolva, Redwood City, CA (US); James R. Walker, San Carlos, CA (US); Samuel B. Schaevitz, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 15/882,651

(22) Filed: Jan. 29, 2018

(65) Prior Publication Data

US 2019/0068003 A1    Feb. 28, 2019

Related U.S. Application Data

(60) Provisional application No. 62/551,711, filed on Aug. 29, 2017.

(51) Int. Cl.
*H02J 50/80* (2016.01)
*H02J 50/12* (2016.01)
*H02J 7/02* (2016.01)

(52) U.S. Cl.
CPC .............. *H02J 50/80* (2016.02); *H02J 7/025* (2013.01); *H02J 50/12* (2016.02)

(58) Field of Classification Search
CPC ............. H02J 50/12; H02J 50/80; H02J 7/025

USPC .......................................................... 307/104
See application file for complete search history.

(56) References Cited

U.S. PATENT DOCUMENTS

| 9,209,627 | B2 | 12/2015 | Baarman et al. |
| 9,455,596 | B2 | 9/2016 | Gonzalez Valdez et al. |
| 9,806,767 | B2 | 10/2017 | Walley et al. |
| 9,843,218 | B2 | 12/2017 | Liu et al. |

*Primary Examiner* — Hal Kaplan
(74) *Attorney, Agent, or Firm* — Treyz Law Group; George Victor Treyz; Jason Tsai

(57) ABSTRACT

A wireless power system may use a wireless power transmitting device to transmit wireless power to a wireless power receiving device. The wireless power transmitting device may transmit wireless power at a wireless power transmission frequency. Wireless power signals at the wireless power transmission frequency can create interference with a sensitive electrical component in the wireless power receiving device when the wireless power transmission frequency lies in a sensitive frequency band associated with the component. Measurement circuitry in the wireless power receiving device can measure the wireless power transmission frequency. In response to determining that the wireless power transmission frequency lies in a sensitive frequency band, the wireless power receiving device may send an in-band wireless power level adjustment request to the wireless power transmitting device. The request causes a frequency adjustment that moves the wireless power transmission frequency out of the sensitive band.

24 Claims, 6 Drawing Sheets

WIRELESS POWER SYSTEM WITH INTERFERENCE AVOIDANCE

This application claims the benefit of provisional patent application No. 62/551,711, filed on Aug. 29, 2017, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a receiving coil and rectifier circuitry for receiving wireless alternating-current (AC) power from a coil in the wireless charging mat that is overlapped by the receiving coil. The rectifier converts the received AC power into direct-current (DC) power.

SUMMARY

A wireless power system may use a wireless power transmitting device to transmit wireless power to a wireless power receiving device. The wireless power transmitting device may transmit the wireless power at a wireless power transmission frequency. Wireless power signals at the wireless power transmission frequency can create interference when the wireless power transmission frequency lies in a sensitive frequency band associated with the sensitive electrical component. The sensitive electrical component may be, for example, an image sensor, a touch sensor, a force sensor, or a display.

Measurement circuitry in the wireless power receiving device can measure the wireless power transmission frequency. In response to determining that the wireless power transmission frequency lies in a sensitive frequency band, the wireless power receiving device may send an in-band wireless power level adjustment request to the wireless power transmitting device. The request directs the wireless power transmitting device to adjust a wireless power transmission level associated with the transmitted wireless power and indirectly causes the wireless power transmitting device to adjust the frequency of the wireless power signals to avoid the sensitive frequency band.

DETAILED DESCRIPTION

A wireless power system has a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device has wireless power transmitting coils arranged under a charging surface. During operation, the wireless power transmitting coils are used to transmit wireless power signals that are received by a wireless power receiving coil in the wireless power receiving device. Wireless power signals are transmitted at a wireless power transmission frequency such as a frequency of about 128 kHz, frequencies in a range between 100 kHz and 200 kHz, or other suitable frequency.

To ensure that the amount of power that is transmitted between the wireless power transmitting device and the wireless power receiving device is satisfactory, power transmission may be regulated dynamically. In some examples, a wireless power receiving device periodically sends wireless power level adjustment requests to the wireless power transmitting device. These requests direct the wireless power transmitting device to increase or decrease the amount of wireless power being transmitted. In some examples, the wireless power transmitting device changes the wireless power transmission frequency as part of adjusting the wireless power transmission level in the wireless power system. In some embodiments, a wireless power receiving device leverages this ability to affect the wireless power transmission frequency via wireless power adjustment level requests to help avoid undesired interference between the wireless power signals and sensitive circuitry in the wireless power receiving device.

Figure 1:
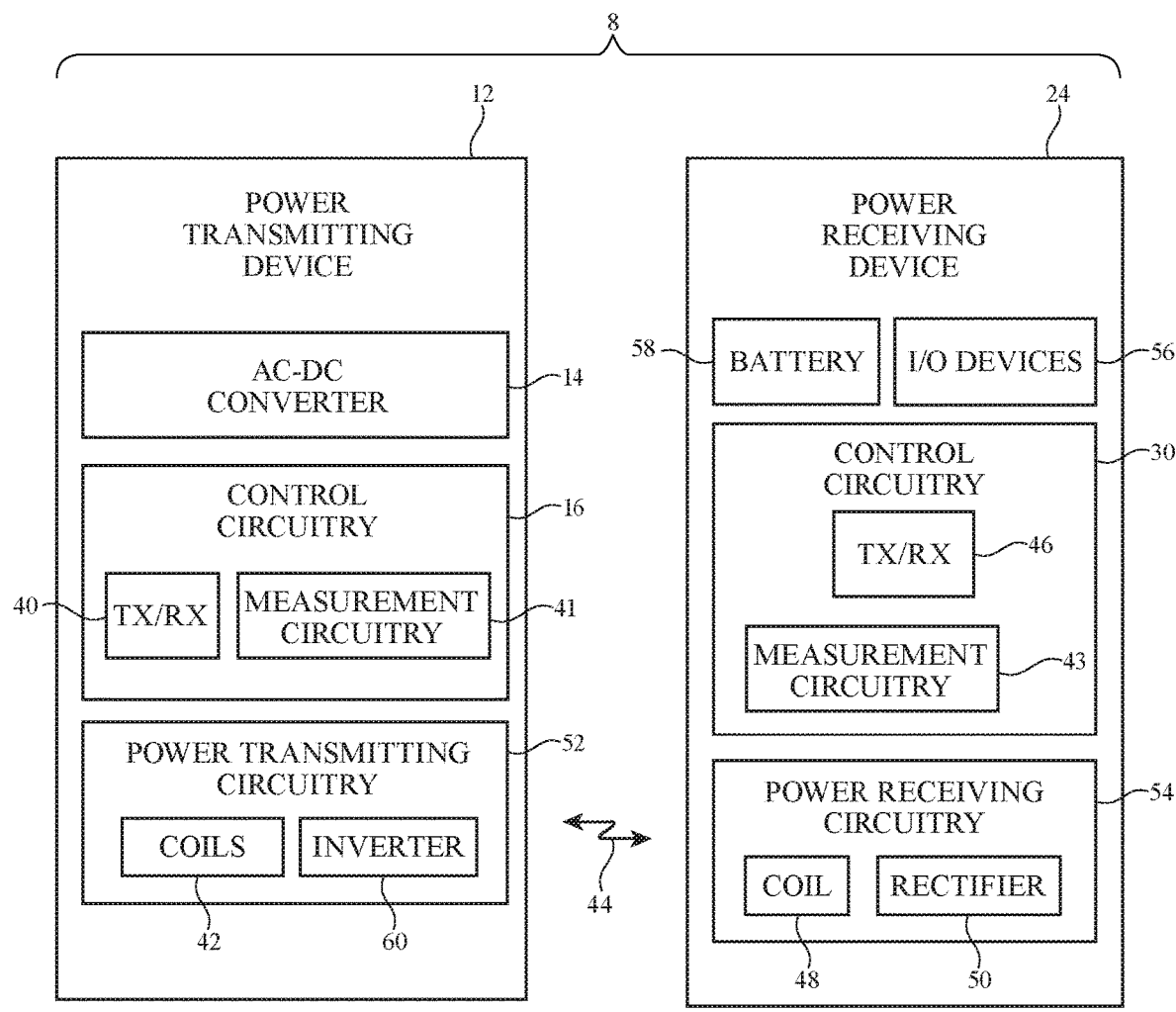
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry includes processing circuitry associated with microprocessors, power management units, baseband processors, digital signal processors, microcontrollers, and/or application-specific integrated circuits with processing circuits. The processing circuitry implements desired control and communications features in devices 12 and 24.

For example, the processing circuitry may be used in determining power transmission levels, processing sensor data, processing user input, handling communications between devices 12 and 24 (e.g., sending and receiving in-band and out-of-band data), selecting wireless power transmitting coils, and otherwise controlling the operation of system 8. If desired, control circuitry in system 8 may be used to authorize components to use power and ensure that components do not exceed maximum allowable power consumption levels.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU), digital signal processing circuits, baseband processors, power management units with processing circuitry, microcontrollers, and other processing circuitry.

Power transmitting device 12 may be a stand-alone power adapter (e.g., a wireless charging mat that includes power adapter circuitry), may be a wireless charging mat that receives power from a power adapter or other equipment using a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other electronic equipment. Power transmitting device 12 may receive power from a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off at an alternating-current wireless power transmission frequency based on control signals provided by control circuitry 16. This creates AC current signals through one or more coils 42. Coils 42 may be arranged in a planar coil array (e.g., in configurations in which device 12 is a wireless charging mat).

As AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, force sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. In some embodiments, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 128 kHz, at least 80 kHz, at least 100 kHz, less than 500 kHz, less than 300 kHz, less than 200 kHz, 100-200 kHz, 50-200 kHz, 100-200 kHz, or other suitable wireless power frequency. In some configurations, device 12 varies power transmission frequency based on the power requirements of device 24. In some configurations, the device 12 transmits power at a fixed power transmission frequency, or a frequency that is at least nominally fixed in that device 12 would not change power transmission frequency in response to receiver power requirements.

In embodiments that support FSK in-band communications, wireless transceiver circuitry 40 uses FSK modulation to modulate the power transmission frequency of the driving AC signals that device 12 is using to transmit wireless power and thereby modulates the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In embodiments that support ASK in-band communications, wireless transceiver circuitry 46 transmits in-band data to device 12 by using a switch (e.g., one or more transistors in transceiver 46 that are connected to coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. Control circuitry 30 has measurement circuitry 43. Measurement circuitry 41 and 43 may be used in making inductance measurements (e.g., measurements of the inductances of coils 42 and 48), input and output voltage measurements (e.g., a rectifier output voltage, and inverter input voltage, etc.), current measurements, capacitance measurements, frequency measurements (e.g., measurements of the frequency of wireless power signals), and/or other measurements on the circuitry of system 8. Illustrative circuitry of the type that may be used for forming power transmitting circuitry 52 and power receiving circuitry 54 of FIG. 1 is shown in FIG. 2.

Figure 2:
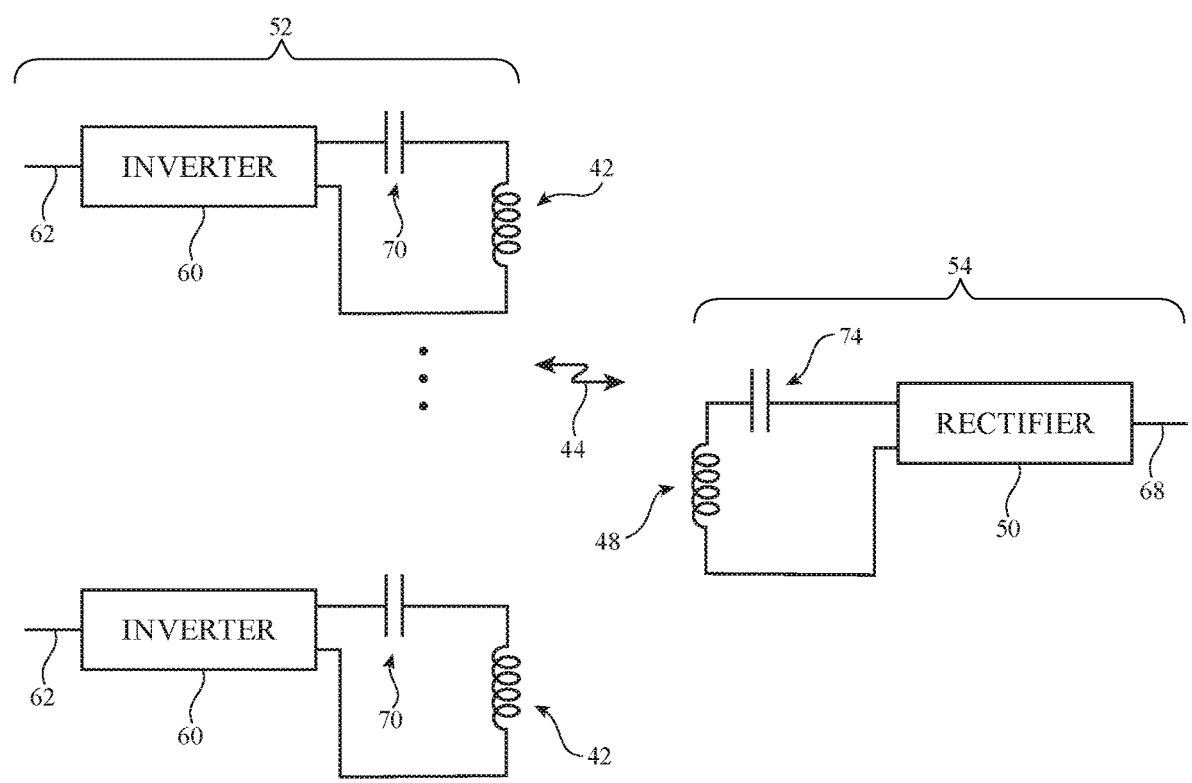
FIG. 2 is a circuit diagram of illustrative wireless power transmitting circuitry and illustrative wireless power receiving circuitry in accordance with an embodiment.

As shown in FIG. 2, power transmitting circuitry 52 may include drive circuitry such as inverters 60 that supply drive signals at the wireless power transmission frequency to respective wireless power transmitter resonant circuits. Each wireless power transmitter resonant circuit may include a wireless power transmitting coil 42 and capacitor 70. Rectifier 50 in wireless power receiving circuitry 54 receives wireless power signals using a wireless power receiver resonant circuit that includes capacitor 74 and wireless power receiving coil 48.

Inverters 60 have metal-oxide-semiconductor transistors or other suitable transistors that are modulated by AC control signals from control circuitry 16 (FIG. 1) that are received on respective control signal inputs 62. The attributes of each AC control signal (e.g., duty cycle, frequency, etc.) may be adjusted by control circuitry 16 dynamically during power transmission to control the amount of power being transmitted by power transmitting coils 42.

When transmitting wireless power, control circuitry 16 (FIG. 1) selects one or more appropriate coils 42 to use in transmitting signals 44 to coil 48 (e.g., control circuitry 16 supplies control signals to the inputs 62 of the inverters 60 that are to drive the selected coils to produce signals 44). Coil 48 and capacitor 74 form a resonant circuit in circuitry 54 that receives signals 44. Receiver 50 rectifies the received signals and provides direct-current output power at output 68.

Figure 3:
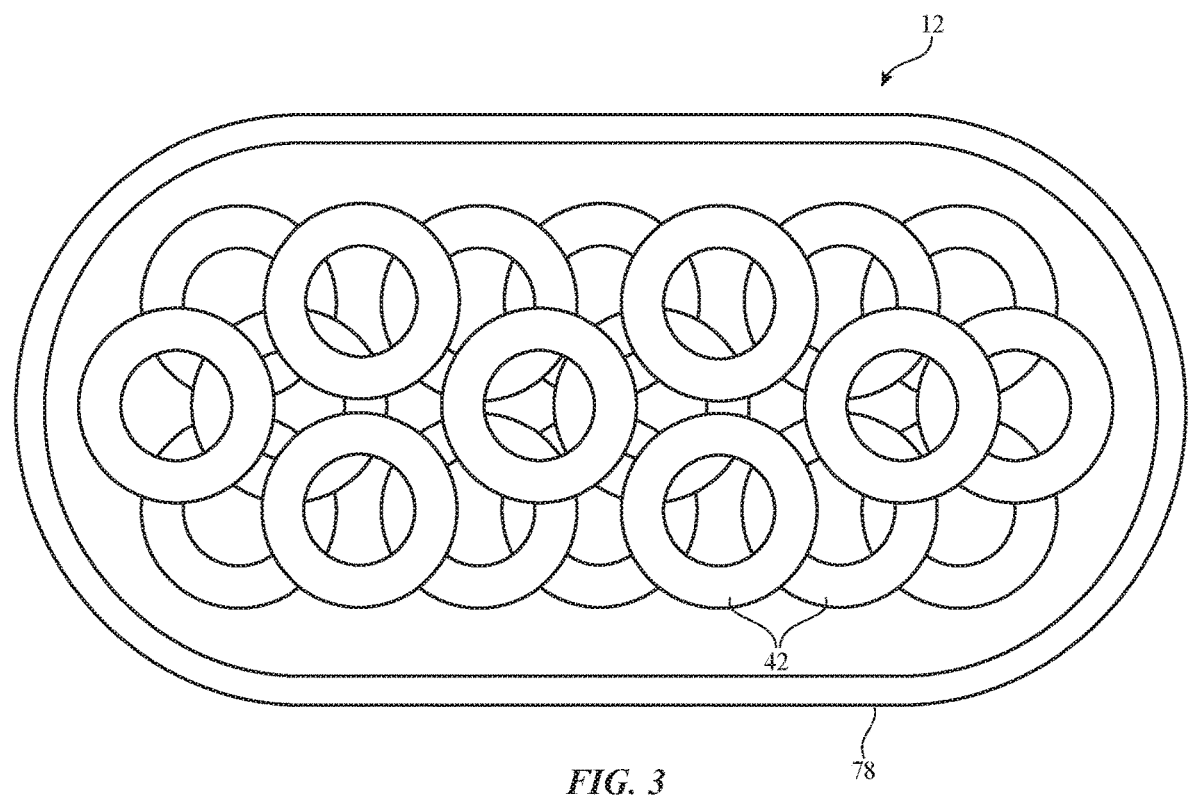
FIG. 3 is a top view of an illustrative wireless power transmitting device in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least one coil, at least 2 coils, at least 3 coils, at least 5 coils, at least 7 coils, at least 10 coils, at least 15 coils, fewer than 30 coils, fewer than 50 coils, etc.). Coils 42 may be arranged in rows and columns and may or may not partially overlap each other. In the example of FIG. 3, coils 42 partially overlap each other and arranged in three layers.

Device 12 may have a housing 78 (e.g., a housing formed from plastic or other materials) that forms a planar housing surface that covers coils 42 (sometimes referred to as a charging surface). One or more wireless power receiving devices such as device 24 may be positioned on the charging surface to receive wireless power from coils 42. Coils 42 may be circular or may have other suitable shapes (e.g., coils 42 may be square, may have hexagonal shapes, may have other shapes having rotational symmetry, etc.). In the illustrative configuration of FIG. 3, coils 42 are circular and are formed from multiple wire turns (e.g., multiple turns formed from metal traces, bare wire, insulated wire, wire monofilaments, multifilament wire, etc.).

Figure 4:
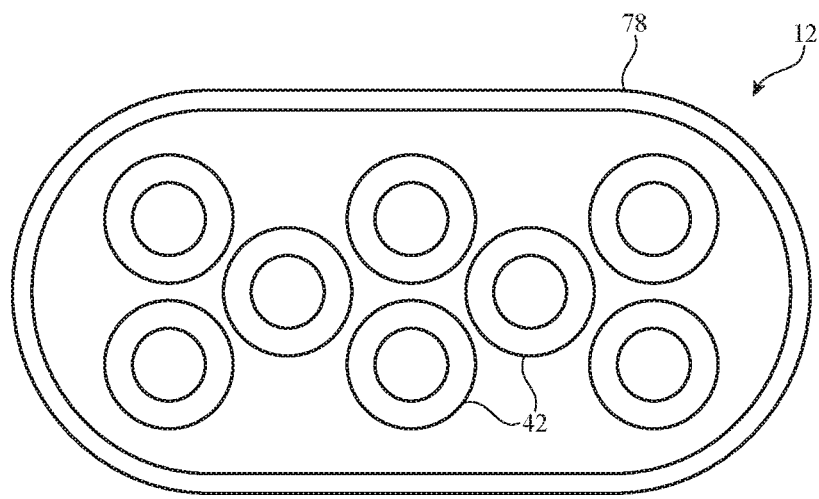
FIG. 4 is a top view of an illustrative lower layer of eight coils for the wireless power transmitting device of FIG. 3 in accordance with an embodiment.
Figure 5:
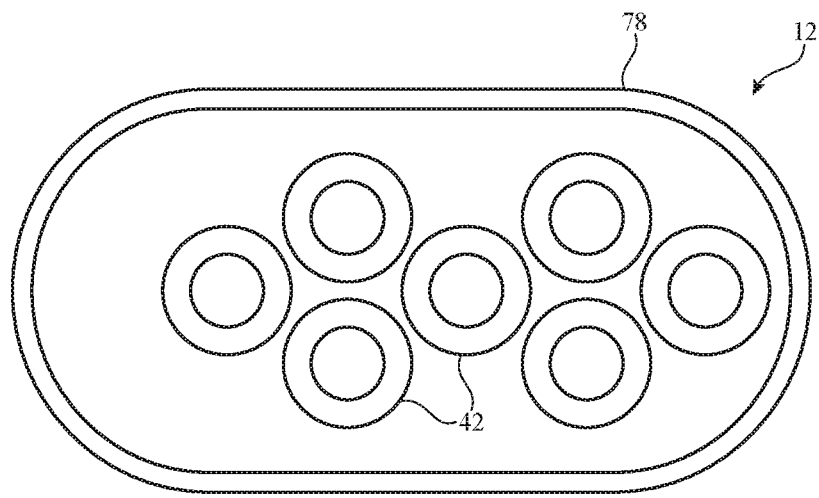
FIG. 5 is a top view of an illustrative middle layer of seven coils for the wireless power transmitting device of FIG. 3 in accordance with an embodiment.
Figure 6:
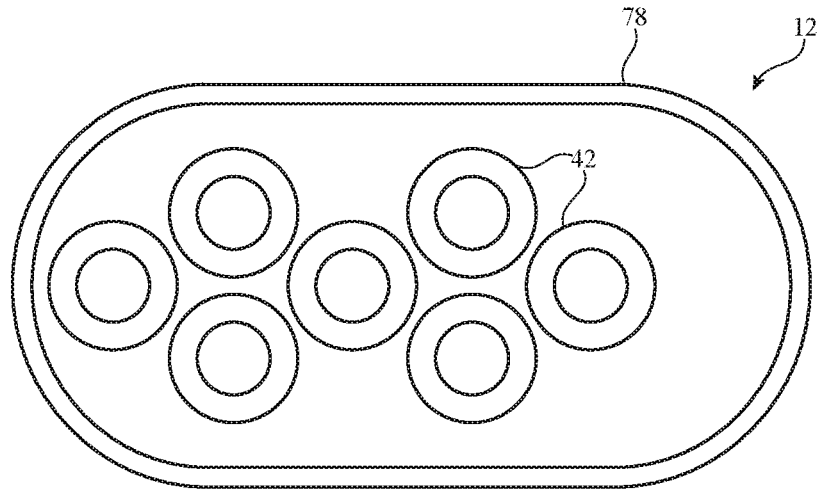
FIG. 6 is a top view of an illustrative upper layer of seven coils for the wireless power transmitting device of FIG. 3 in accordance with an embodiment.

FIGS. 4, 5, and 6 are diagrams of illustrative layers of coils 42 in a wireless power transmitting device such as a charging mat having 22 coils in three layers.

FIG. 4 is a top view of an illustrative configuration for a lower layer having eight coils 42 in wireless power transmitting device 12 of FIG. 3. FIG. 5 is a top view of an illustrative configuration for a middle layer having seven coils 42 for wireless power transmitting device 12 of FIG. 3. FIG. 6 is a top view of an illustrative configuration for an upper layer having seven coils for wireless power transmitting device 12 of FIG. 3. In this example, the lower layer has 8 coils, the middle layer has 7 coils, and the upper layer has 7 coils. In general, each layer may have any suitable number of coils (e.g., at least 2 coils, at least 5 coils, fewer than 9 coils, fewer than 14 coils, 6-9 coils, etc.). Device 12 may have one layer of coils 42, at least two layers of coils 42, at least three layers of coils 42, at least four layers of coils 42, fewer than five layers of coils 42, 4-6 layers of coils, etc. Configurations in which device 12 has only a single coil 42 may also be used.

Device 24 may contain circuitry that is sensitive to radio-frequency signal interference. This circuitry may include, for example, input-output devices 56 such as a display, a touch sensor (e.g., a two-dimensional capacitive touch sensor) overlapping the display, a radio (e.g., an amplitude modulation radio), a force sensor, digital image sensors (e.g., infrared and/or visible light image sensors for components such as cameras, etc.), and/or other sensitive circuitry. During wireless power transmission, the wireless power signals 44 that are transmitted to device 24 can directly interfere with the sensitive circuitry and/or can interfere with the sensitive circuitry by generating interfering signal harmonics. For example, some touch sensors do not sense touches properly when subjected to radio interference and some force sensors do not sense force input properly when subjected to radio interference. For example, some displays do not display frames consistently (e.g., images appear wavy) when subjected to radio interference.

To prevent disruption to the operation of device 24 as wireless power signals are being transmitted by device 10, device 24 can be characterized using testing equipment (e.g., during manufacturing). The testing equipment can supply signals 44 over a range of potential operating frequencies while the performance of radio-frequency-interference-sensitive components in device 24 is monitored. Frequency bands in which undesired interference effects are detected can be identified. Information on these frequency bands (which may sometimes be referred to as disallowed frequency bands, sensitive frequency bands, interference-producing frequency bands, etc.) such as start and end frequencies for the frequency bands may be stored in memory in device 24. During wireless power transfer operations, device 24 can measure the wireless power transmitting frequency in use, can compare this measured frequency to the stored sensitive frequency bands, and can take action to avoid use (or at least to avoid prolonged use) of wireless power signals with frequencies in the sensitive frequency bands.

In systems in which the frequency of power transmitting circuitry 52 can be adjusted in response to frequency adjustment commands from device 24, device 24 can send frequency adjustment commands to device 12 whenever power is being transmitted at a wireless power transmission frequency that falls within a sensitive frequency band. In some configurations, however, device 12 may not support the use of frequency adjustment commands.

To prevent interference in scenarios in which device 12 does not support frequency adjustment commands, device 24 can transmit power adjustment commands to device 12 that indirectly cause device 24 to adjust its wireless power transmission frequency.

Figure 7:
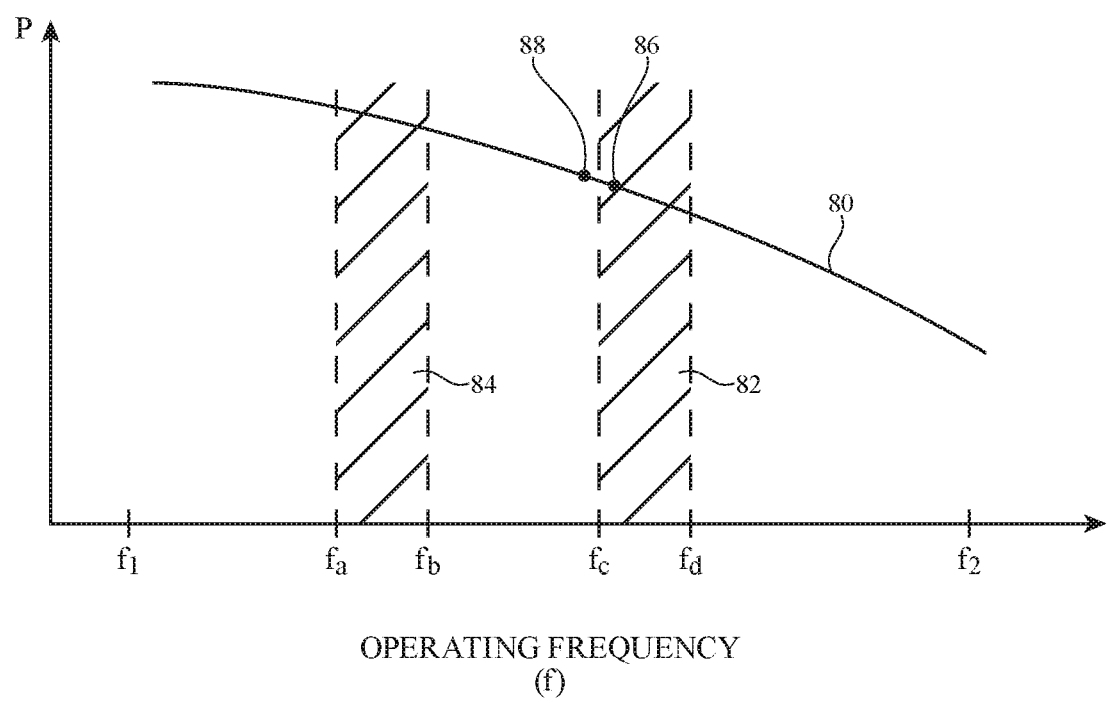
FIG. 7 is a graph of an illustrative relationship between wireless power transmission level and wireless power transmission frequency for a wireless power transmitting device in accordance with an embodiment.

Consider, as an example, the scenario illustrated in FIG. 7. In FIG. 7, the output power P of an illustrative wireless power transmitting device such as device 12 has been plotted as a function of wireless power transmission frequency f (curve 80). Illustrative sensitive frequency bands associated with an illustrative wireless power receiving device (e.g., sensitive frequency band 84 extending from frequency fa to frequency fb and sensitive frequency band 82 extending from frequency fc to frequency fd) are also plotted in FIG. 7. When device 12 transmits wireless power at a frequency f that lies outside of bands 84 and 82 (and within permitted frequency range f1 to f2, which may be, for example, 100 kHz to 200 kHz or other suitable permitted frequency range), device 24 operates within design tolerances, for example, in its ability to sense input and provide output. However, when device 12 transmits wireless power at a frequency f that lies within one of sensitive bends 84 and 82, the transmitted wireless power signals interfere with the operation of device 12. For example, images displayed on a display in device 24 will contain undesired visual artifacts, touch sensor or force sensor measurements will contain excessive noise, the reception of wireless communications signals (e.g., cellular or WiFi) will be adversely affected, and/or sensitive components such as digital image sensors will not be able to capture satisfactory images.

During operation, wireless power receiving device 24 may require varying amounts of wireless power. When an increase in power is desired, wireless power receiving device 24 transmits a wireless power adjustment request (e.g., a wireless power adjustment command) that requests and thereby causes device 12 to increase its transmitted power level. Device 24 can issue wireless power adjustment requests that cause device 12 to decrease the amount of wireless power being transmitted when device 24 desires to receive less power from device 12. Device 12 may satisfy these power adjustment requests by using control circuitry 16 to adjust the drive signals provided to the inverter circuitry in device 12 and thereby adjust the properties of wireless power signals 44. Notably, device 12 adjusts the wireless power transmission frequency f that is associated with the drive signals for inverter circuitry 60 and that is associated with wireless power signals 44 in accordance with curve 80. In exemplary curve 80, when less power is required, frequency f is adjusted upwards. When more power is required, frequency f can be lowered.

Device 24 can use measurement circuitry 43 to measure the frequency f of the wireless power signals that are being received by wireless power receiving circuitry 54. Whenever frequency f overlaps a sensitive frequency band such as band 84 and band 82 of FIG. 7, device 24 can use ASK in-band communications and/or other wireless communications to transmit a wireless power level adjustment request to device 12. The wireless power level adjustment request directs device 12 to adjust the amount of wireless power being transmitted and indirectly causes the wireless power transmission frequency to be adjusted out of the sensitive band. If, as an example, it is determined that wireless power signals are being transmitted at a frequency associated with operating point 86 in sensitive band 82, device 24 can transmit a wireless power adjustment request to device 12 that requests that device 24 increase its wireless power transmission level. In response, device 12 may transition from transmitting wireless power at the power and frequency associated with point 86 to a higher power (and therefore lower frequency) associated with operating point 88. The wireless power transmission frequency at operating point 88 is a safe frequency that is outside sensitive frequency band 82, so interference with the operation of components of device 24 is avoided.

Figure 8:
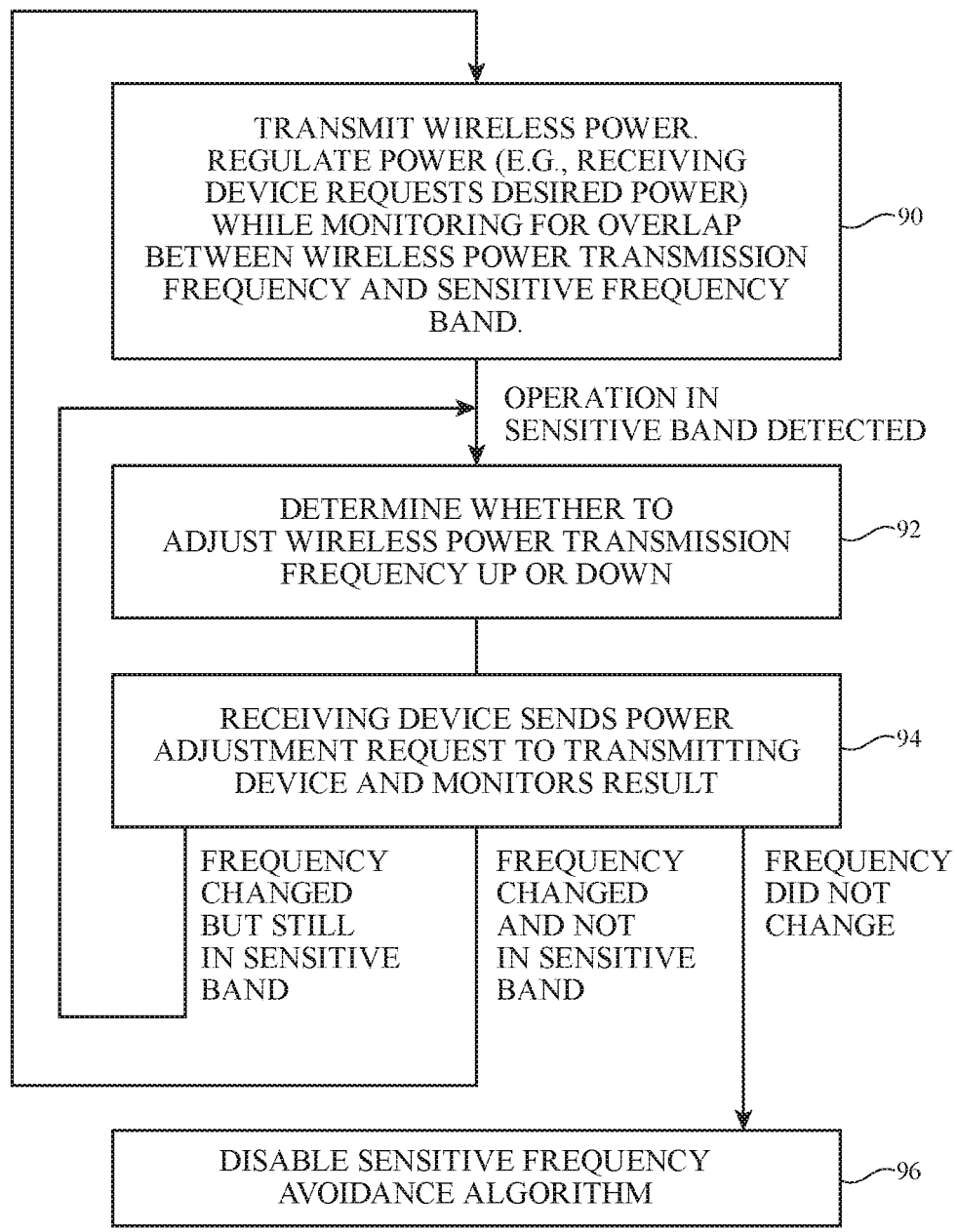
FIG. 8 is a flow chart of illustrative operations involved in transmitting wireless power in a wireless power system while avoiding sensitive frequency bands associated with electrical components in a wireless power receiving device in accordance with an embodiment.

FIG. 8 is a flow chart of illustrative operations associated with operating system 8 while preventing undesired interference between the wireless power signal transmitted by device 12 and the operation of sensitive components in device 24.

During the operations of block 90, device 12 transmits wireless power signals 44 at wireless power transmission frequency f and power P. Wireless power receiving device 24 receives the transmitted signals using power receiving circuitry 54 while using measurement circuitry 43 or other suitable circuitry in device 24 to measure the frequency associated with the transmitted wireless power signals. The frequency f may be compared to the known (stored) sensitive frequency bands (e.g., bands 82 and 84 in the example of FIG. 7). So long as the frequency f of the wireless power signals lies outside of the sensitive bands, wireless power can be transmitted normally. During these normal operations, device 24 may occasionally issue wireless power level adjustment commands according to the time-varying power needs of device 24. Due to adjustments made by device 12 and/or changes made by device 12 in response to normal wireless power level adjustment commands received from device 24, the wireless power transmitting frequency f may move into a sensitive frequency band.

When operation in a sensitive frequency band is detected by device 24 (e.g., by wireless-power-transmission-frequency measurement circuitry such as circuitry 43), device 24 may take corrective action. In some examples, during the operations of block 92, device 24 may determine whether the wireless power transmission frequency should be adjusted up or down. Device 24 may, as an example, determine that the wireless power transmission frequency should be moved towards the closest edge of the sensitive band. As an example, the wireless power frequency may be lowered to avoid operating in band 82 in scenarios in which the operating frequency for device 12 lies within band 82 close to lower frequency fc and may be raised to avoid operating in band 82 in scenarios in which the operating frequency for device 12 lies within band 82 close to upper frequency fd. In some examples, device 24 determines that the last frequency change was a change in a particular up or down direction, and again moves the frequency in the same direction.

During the operations of block 94, device 24 may determine how much the wireless power level P should be adjusted in the power level adjustment request (e.g., device 24 may determine a desired value of power level adjustment ΔP) and may supply a corresponding wireless power adjustment request to device 12 (e.g., using in-band communications such as ASK data transmission between device 24 and device 12). The value of ΔP may be determined by computing a fixed fraction (e.g., 10%, 1-15%, 0.01-2%, at least 0.5%, at least 2%, less than 7%, less than 1.5%, or other suitable amount) of the current wireless power level P, may be based on the size of the sensitive frequency band in which the wireless power transmission frequency lies (e.g., so that larger bands results in larger ΔP values), and/or may be based on other suitable criteria (e.g., the wireless power transmission frequency, the distance of the wireless power transmission frequency to the closest sensitive band edge, etc.). Device 24 may also use its wireless power transmission frequency monitoring circuitry to measure the change in wireless power transmission frequency that results from the requested change in wireless power transmission level.

In response to determining that the wireless power transmission frequency has changed, but still lies within a sensitive frequency band, the operations of blocks 92 and 94 can be repeated to make sure that the wireless power transmission frequency is moved out of the sensitive band.

In response to determining that the wireless power transmission frequency has changed and no longer lies within a sensitive frequency band, operations may loop back to block 90 (normal operation).

In response to determining that the wireless power transmission frequency did not change in response to a given power adjustment request sent to device 12 or more than a predetermined number of power adjustment requests send to device 12, device 24 may, if desired disable frequency avoidance operations (e.g., block 96) for a predetermined period of time, until device 24 pairs with a new wireless power transmitting device, and/or until other criteria have been satisfied. This may help avoid unnecessary power adjustments in systems in which power adjustments are determined to not readily result in frequency adjustments of the type associated with curve 80 of FIG. 7. In some configurations, device 24 may, if desired, change the direction of power adjustments (and therefore the direction of frequency adjustments) that are being made in response to determining that attempts to avoid a sensitive band are not succeeding. This allows avoidance of a sensitive band in situations in which the current frequency is at an edge of an allowed frequency band of device 24 and is therefore unable to be further adjusted in the current direction. In some embodiments, device 24 may additionally or alternatively cause a change in operation of a sensitive electrical component in response to determining that the wireless power transmission frequency did not change in response to the power adjustment request sent to device 12. For example, a display frame rate may be adjusted, an image sensor frame rate may be adjusted, a touch sensor or force sensor clock may be adjusted, wireless communications frequencies being used to handle a communications session may be adjusted, or other changes may be made.

The foregoing is merely illustrative and various modifications can be made to the described embodiments. The foregoing embodiments may be implemented individually or in any combination.

What is claimed is:

1. A wireless power receiving device configured to receive wireless power signals transmitted from a wireless power transmitting device, the wireless power receiving device comprising:
   wireless power receiving circuitry having a wireless power receiving coil and rectifier circuitry coupled to the wireless power receiving coil;
   wireless power transmission frequency measurement circuitry configured to measure the frequency of a wireless power signal received at the wireless power receiving coil;
   an electrical component that is sensitive to wireless transmission at a sensitive frequency band; and
   control circuitry configured to:
      determine whether the frequency of the wireless power signal received at the wireless power receiving coil overlaps the sensitive frequency band; and
      upon determining that the frequency of the wireless power signal received at the wireless power receiving coil overlaps the sensitive frequency band, send a wireless power level adjustment request to the wireless power transmitting device.

2. The wireless power transmitting device of claim 1 wherein the control circuitry is configured to determine whether the wireless power level adjustment request includes a request for an increase or for a decrease in wireless power transmission from the wireless power transmitting device.

3. The wireless power transmitting device of claim 1 wherein the wireless power level adjustment request is associated with a request for an amount of wireless power level change and wherein the control circuitry is configured to determine the amount of wireless power level change based at least partly on a size of the sensitive frequency band.

4. The wireless power transmitting device of claim 1 wherein the wireless power level adjustment request is associated with a request for an amount of wireless power level change and wherein the control circuitry is configured to determine the amount of wireless power level change based at least partly on the frequency of the wireless power signal received at the wireless power receiving coil.

5. The wireless power receiving device of claim 1 wherein the control circuitry is configured to at least temporarily disable sending of wireless power adjustment requests in response to determining that the wireless power level adjustment request resulted in no change in the wireless power transmission frequency.

6. The wireless power receiving device of claim 5, wherein the control circuitry is configured to cause a change in operation of the electrical component, in response to determining that the wireless power level adjustment request resulted in no change in the frequency of the wireless power signal received at the wireless power receiving coil.

7. The wireless power receiving device of claim 1 wherein the electrical component comprises a display.

8. The wireless power receiving device of claim 1 wherein the electrical component comprises a touch sensor.

9. The wireless power receiving device of claim 1 wherein the electrical component comprises an image sensor.

10. The wireless power receiving device of claim 1 wherein the electrical component comprises a force sensor.

11. The wireless power receiving device of claim 1 wherein the control circuitry comprises in-band transmitter circuitry configured to send the wireless power level adjustment request to the wireless power transmitting device.

12. The wireless power receiving device of claim 11 wherein the in-band transmitter circuitry comprises an amplitude-shift-keying in-band transmitter.

13. A wireless power receiving device, comprising:
wireless power receiving circuitry configured to receive wireless power signals at a wireless power transmission frequency; and
control circuitry configured to transmit a wireless power transmission level adjustment request based on determining that the wireless power transmission frequency lies in a sensitive frequency band.

14. The wireless power receiving device of claim 13 wherein the control circuitry comprises an amplitude-shift-keying transmitter configured to send the wireless power transmission level adjustment request.

15. The wireless power receiving device of claim 13 further comprising a display, wherein the sensitive frequency band is associated with interference between the wireless power signals at a wireless power transmission frequency in the sensitive frequency band and operation of the display.

16. The wireless power receiving device of claim 13 further comprising a touch sensor, wherein the sensitive frequency band is associated with interference between the wireless power signals at a wireless power transmission frequency in the sensitive frequency band and touch detection by the touch sensor.

17. The wireless power receiving device of claim 13 further comprising a sensor, wherein the sensitive frequency band is associated with interference between the wireless power signals at a wireless power transmission frequency in the sensitive frequency band and operation of the sensor.

18. The wireless power receiving device of claim 17 wherein the sensor comprises an image sensor.

19. The wireless power receiving device of claim 17 wherein the sensor comprises a force sensor.

20. The wireless power receiving device of claim 13 wherein the wireless power receiving circuitry comprises a wireless power receiving coil and rectifier circuitry coupled to the wireless power receiving coil.

21. The wireless power receiving device of claim 13 further comprising:
wireless power transmission frequency measurement circuitry configured to detect a frequency of wireless power signals at the wireless power receiving coil.

22. A wireless power receiving device configured to receive wireless power signals transmitted from a wireless power transmitting device at a wireless power transmission frequency, comprising:
wireless power receiving circuitry configured to receive the wireless power signals, the wireless power receiving circuitry comprising a wireless power receiving coil;
circuitry configured to detect wireless power signals of the wireless power transmission frequency at the wireless power receiving coil;
control circuitry configured to:
determine whether the measured wireless power transmission frequency lies within a sensitive frequency band; and
upon determining that the measured wireless power transmission frequency lies within the sensitive frequency band, sending a wireless power level adjustment request to the wireless power transmitting device that causes the wireless power transmitting device to adjust a power level associated with the wireless power signals and that causes the wireless power transmitting device to adjust the wireless power transmission frequency out of the sensitive frequency band.

23. The wireless power receiving device of claim 22 further comprising:
an electrical component subject to interference in the presence of wireless power signals in the sensitive frequency band.

24. The wireless power receiving device of claim 23 wherein the electrical component comprises a component selected from the group consisting of: a display, a touch sensor, and an image sensor.

* * * * *